INVENTOR.
MILTON C. WELCH,
BY
McMorrow, Berman + Davidson
ATTORNEYS.

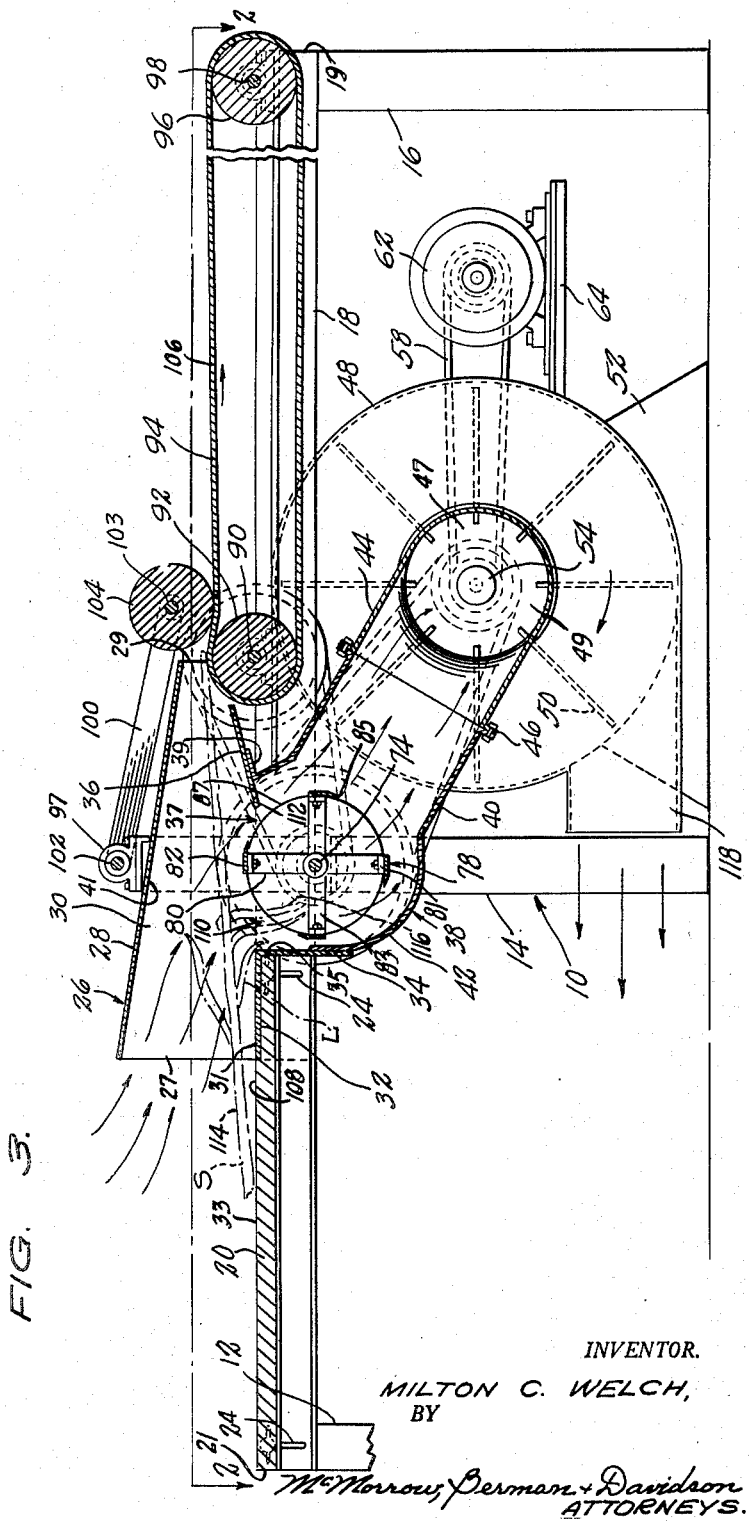

United States Patent Office 2,868,208
Patented Jan. 13, 1959

2,868,208

STALK STRIPPER

Milton C. Welch, Toomsuba, Miss.

Application April 13, 1956, Serial No. 577,976

2 Claims. (Cl. 130—31)

The present invention relates to apparatus designed to strip fodder or leaves from various types of stalks, such as cane, sorghum, etc. While the invention is particularly adapted for stripping fodder from the named stalks, it can be used to equal advantage in stripping operations performed on other types of stalks.

Summarized briefly, the invention includes a supporting frame having a table adjustable in a vertical direction and disposed in a horizontal plane. From this table stalks are fed into a hood, and through the provision of a blower, air is drawn into the hood, passing therethrough in the same direction as the stalks, with substantial force, said air thus tending to draw the stalks through the hood. Within the hood there is provided a rotating cutter means, having blades so disposed as to strip the fodder from the stalks during passage of the stalks through the hood, said blades further serving to strike the stalks and impel the same forwardly in cooperation with the air stream created within the hood. At the outlet end of the hood, the stalks are fed onto a conveyor belt, and through the provision of a roller contacting said belt, are pulled out of the hood so as to move to the discharge end of the frame, with the stripped, chopped fodder being directed through the outlet of the blower means to a different location. The blower and conveyor belt are so arranged as to be permitted to act simultaneously both on small and large stalks.

The main object of the present invention is to provide a generally improved stalk stripping apparatus, and among more particular objects of the invention are the following:

To provide apparatus of the type stated wherein the forward movement of the stalks will be effected by the fodder-stripping, bladed rotor, acting coactively with an air stream passing the stalks in a direction to convey the fodder following stripping of the fodder from the stalks;

To so design the stalk stripper as to permit ready adjustments to be made, for the purpose of accommodating the apparatus for operating on stalks of different sizes, densities, etc.;

To permit effective stripping of stalks regardless of the thickness, length, and other physical characteristics thereof, stalks differing from one another in one or more of these respects all being capable of being acted upon simultaneously by the apparatus;

To provide an apparatus for the purposes described which, though of simple design and capable of manufacture at relatively low cost considering the benefits to be obtained from the use thereof, will still be adapted to strip fodder from a substantial number of stalks during a predetermined interval;

To so design the apparatus as to effect a particular relationship of the feeding table, bladed rotor, and air stream, which relationship will have the effect of providing a highly improved action not heretofore accomplished in stalk stripping machines; and To provide apparatus of the type referred to which will be substantially trouble-free in operation, will require minimum attention by the worker, and will effectively strip and chop the fodder, ready for use.

Other objects will appear from the following description, the claims appended thereto, and from the annexed drawing, in which like reference characters designate like parts throughout the several views, and wherein:

Figure 3 is a longitudinal section, substantially on line 3—3 of Figure 2, a portion being broken away.

Figure 1:
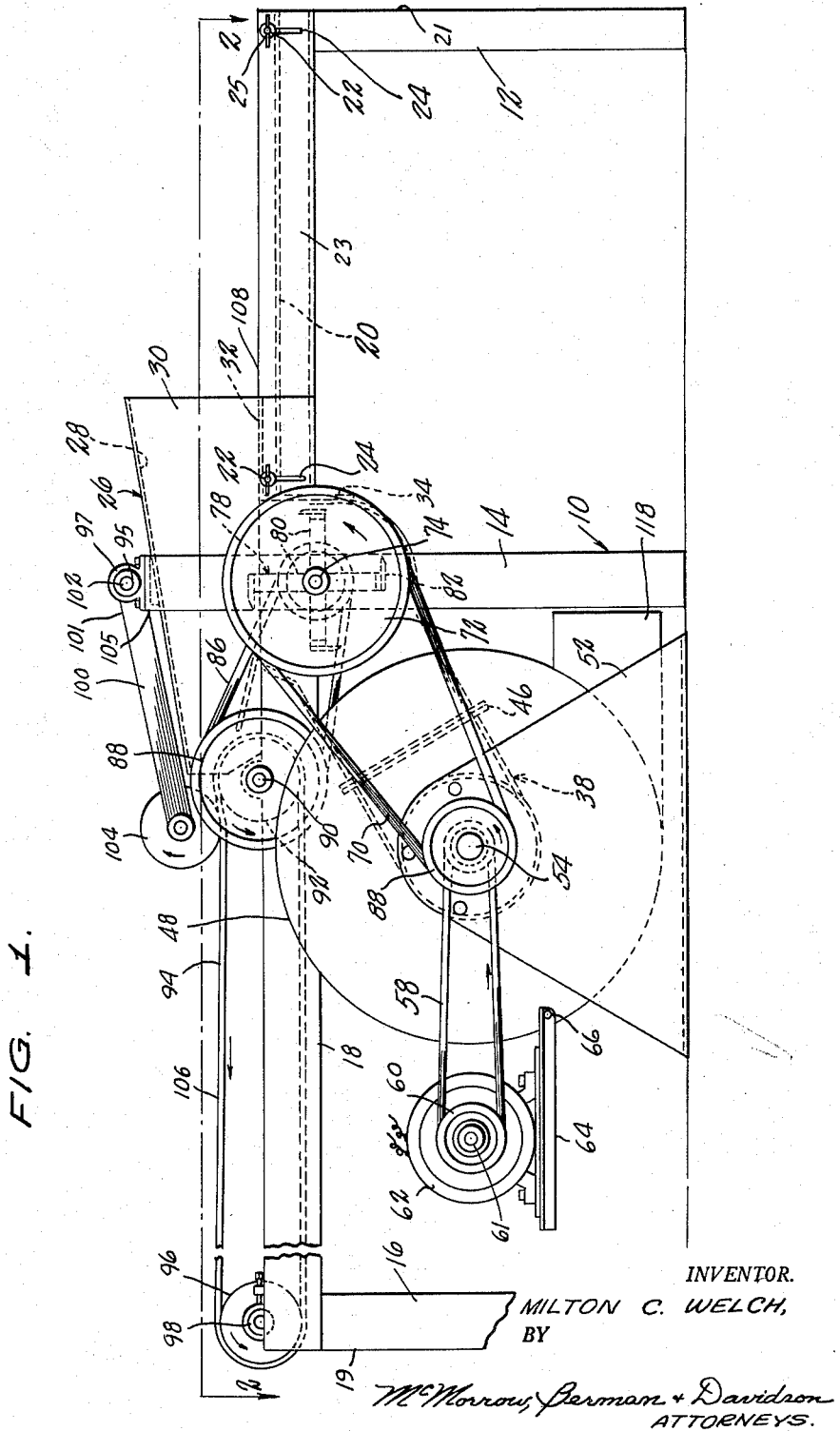
Figure 1 is a side elevational view of stalk stripping apparatus formed according to the present invention, a portion being broken away.

Referring to the drawings in detail, the reference numeral 10 generally designates a supporting frame. While the frame construction can vary in a commercial embodiment, in the illustrated example the frame includes transversely spaced, vertically disposed support legs 12 at the entrance end of the apparatus, intermediate, vertical legs 14 extending to a height greater than legs 12, and vertical legs 16 provided at the discharge end of the apparatus.

Fixedly secured to and extending horizontally between the several legs are side rails 18, said rails extending from one end 19 to the other end 21 of the frame.

Figure 2:
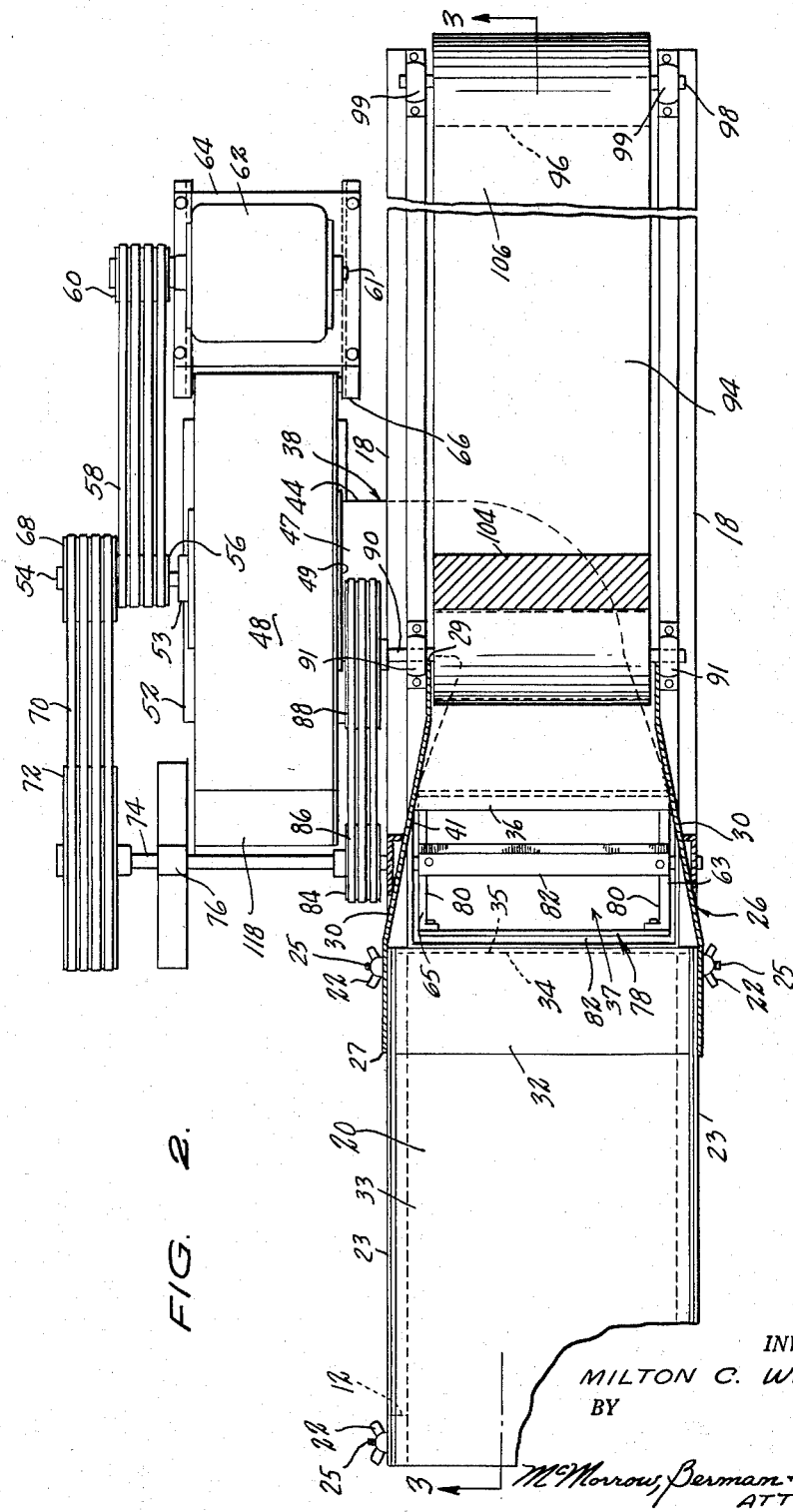
Figure 2 is a plan sectional view on line 2—2 of Figure 1, with the apparatus reversed end for end from the Figure 1 position thereof.

Referring to Figures 2 and 3, at the entrance end of the apparatus there is provided a table 20. The table 20 extends the full width of the frame, between the side rails 18 thereof, with one end of the table terminating at the left hand extremity of the frame, viewing the same as in Figures 2 and 3. The other end of the table terminates a short distance from the intermediate legs 14. Table 20 is disposed in a horizontal plane, and extending into the opposite sides 23 of the table, at opposite ends of the table, are studs 25 adapted to receive wing nuts 22 (Figure 2). In the side rails 18, short, vertical slots 24 are formed, through which the studs 25 extend.

Due to this arrangement, the table 20 can be adjusted in a vertical direction, while remaining in a horizontal plane, within limits defined by the opposite ends of the slots 24. The purpose of this is to dispose stalks S fed into the apparatus in selected positions relative to a bladed rotor 78, for a purpose to be made presently apparent herein.

Disposed between the side rails 18, and lying wholly above the plane of the table 20, is a hood 26. The hood 26 may be made of sheet metal or the like, and is progressively decreased in height, from its inlet 27 to its outlet end 29, as shown in Figure 3. Further, the hood is progressively reduced in width from the inlet end thereof to the opposite end as shown in Figure 2. The hood, thus, has a top wall 28 inclined slightly from the horizontal, and side walls 30 converging in the direction of the stalk outlet of the hood.

In the inlet end of the hood, the table 20 provides a floor portion 31 for the hood as shown in Figure 3, and the portion of the table that extends into the hood in this manner is shallowly recessed to receive a plate 32 which is fixedly secured to the table surface 33 in any suitable manner. Integral with the plate 32 and extending downwardly from the inner extremity 35 of table 20 is a vertically disposed extension plate 34.

Spaced forwardly from the plate 32 is a pan 36, of flat, plate-like formation, extending across the full width of the hood. Pan 36 cooperates with plate 32 in providing floor pans for the hood, and these are spaced apart a substantial distance, medially between the opposite ends of the hood, to provide an opening 37 through which the fodder or leaves L, when stripped from the stalks, will pass.

A fodder conduit generally designated at 38 has its inlet end connected to the pan 36, and to the extension plate 34, thus to connect the inlet end 39 of the fodder conduit in communication with the intermediate portion 41 of the hood, at the location of the fodder-receiving opening defined between the floor pans 32, 36.

Conduit 38 may extend in a selected direction, and this may vary according to the desires of the particular manufacturer. However, in accordance with the present invention the fodder conduit includes a hood-attached inlet portion 40 inclined from the vertical, downwardly, forwardly from the hood as shown in Figure 3. Portion 40 has an enlarged part 42 within which the bladed rotor of the invention is mounted.

An outlet portion 44 of the conduit is of L-shape, as shown in Figure 2, and at its inlet end is connected, through the medium of bolts passing through contacting flanges 46, to the portion 40.

At its outlet end 47, the conduit portion 44 is connected to the centrally disposed inlet 49 of a large centrifugal fan or blower including a housing 48 spaced laterally from the frame as shown in Figure 2. Within the housing 48 a fan rotor 50 is rotated at high speed, preferably but not necessarily, at approximately three thousand R. P. M. The housing is supported upon upstanding bearing plates 52, provided with bearings 53 for the shaft 54 of the rotor 50.

Referring now to Figures 1 and 2, secured to the shaft 54, exteriorly of the housing 48, is a pulley 56, about which is turned a drive belt 58 trained also about a drive pulley 60 carried by the shaft 61 of a motor 62 mounted upon a motor support 64, said support 64 being connected to the housing 48 at 66. The support 64 can of course be free of connections to the blower, and can be, if desired, attached directly to the frame in any suitable manner.

Thus, on operation of the motor, the blower is driven. Connected to the shaft 54 of the blower is a pulley 68 about which is trained a drive belt 70 driving a large diameter pulley 72 secured to a shaft 74 journalled in a bearing 76.

Shaft 74 extends through the enlarged part 42 of the conduit 38, and secured within the enlarged part 42, to the shaft 74, is the rotor 78.

The rotor 78 includes spiders 80 spaced longitudinally of the shaft 74, and secured to the outer ends 81 of the arms 83 of the spiders are blades 82. The blades 82 are sharpened along their leading edges 85, in the sense of direction of rotation of the rotor, said blades extending from one end 63 to the other end 65 of the rotor in parallel relation to the rotor axis. The blades in the illustrated, preferred embodiment are angularly spaced 90 degrees apart about the rotor circumference 87, but this spacing can be varied if found suitable.

Also secured to the shaft 74 (see Figure 2) is a pulley 84, driving a belt 86 in turn passing about a large diameter pulley 88. This is secured to a shaft 90 journalled in bearings 91 mounted upon the respective side rails 18 of the frame. Shaft 90 is secured to a conveyor drive roller 92 (Figure 3) about which is trained an endless conveyor belt 94 extending through the discharge end of the apparatus, at which location the belt passes about an idler roller 96, mounted upon a shaft 98 journalled in bearings 99 carried by the side rails 18 of the frame.

Overlying the conveyor belt is a feed roller 104. As shown in Figure 3, arms 100 have a pivotal connection 97, at one end 101 of the arms 100, to a cross bar 102 the ends 95 of which are engaged in bearings provided at the upper ends 105 of the intermediate legs 14. A shaft 103 extends between the other ends of the arms 100, and freely rotatable on or with the shaft 103 is the feed roller 104.

As will be noted, the feed roller is in contact with the upper flight 106 of the conveyor belt, a short distance forwardly of the conveyor drive roller 92. This is of importance, in view of the fact that the feed roller flexes the belt downwardly to a slight extent, so that the feed roller, acting in cooperation with the belt and the drive roller, will pull both small and large stalks S through the smaller stalk outlet end of the hood 26, simultaneously.

In use of the apparatus, the table 20 is adjusted to a selected elevation. The purpose of this is to cause the apparatus to act efficiently on stalks of varying degrees of toughness. It has been ascertained that the entry level 108 of the table should be lowered for some of the material acted upon by the apparatus, while the table should be elevated for acting efficiently upon other material. The elevation of the table disposes the same in different horizontal planes relative to a horizontal plane tangential to the top of the rotor. Thus, in Figure 3 the plane of the table is slightly below said plane tangential to the top of the rotor.

In any event, as the stalks S enter the larger end of the hood, they are drawn forwardly within the hood due to the air current passing through the hood resulting from operation of the blower. The air enters the hood in the direction of the arrows shown in Figure 3, and will be pulled downwardly through the large opening 110 in the bottom 112 of the hood, within which opening the rotor is mounted. The rotor rotates in a clockwise direction, viewing the same as in Figure 3, that is, the blades during their travel above the rotor axis are traveling in the direction in which the stalks are passing through the hood. Further, this is the same direction as that of the air, during the movement of the air from the inlet end of the hood to the opening in which the rotor is mounted.

It has been found that this arrangement produces the desirable result that the leading, sharpened edges of the blades effectively clip the fodder or leaves L from the stalk. Further, the stalks, due to the plane of the feed table relative to the top of the rotor, and due to the provision of the air stream, are sucked downwardly into contact with the blades, so that the blades strike the undersides 114 of the stalks, forcing the stalks forwardly toward the smaller end of the hood. In this connection, the leading or top ends 116 of the stalks, which are somewhat flexible, are also sucked downwardly, and are clipped off by the blades and directed into the fodder conduit.

The striking of the stalks by the blades forces the stalks slightly upwardly and forwardly, directing the same to the smaller end of the hood, into the area between the feed roller 104 and the top flight of the conveyor belt. As a result, the stalks are now engaged between the conveyor belt and feed roller, and are pulled out of the hood, traveling along the conveyor belt for discharge from the apparatus.

The fodder, meanwhile, stripped from the stalk and cut by the rotor, is drawn by the air current through the conduit 38, and then through the blower, to be discharged from the outlet 118 of the blower.

The relative speeds of rotation of the rotor, fan, etc. can be varied as desired. In a working embodiment, for example, the fan can be rotated at approximately three thousand R. P. M., with the cutter head rotating at 1400 to 1500 R. P. M., and the conveyor drive pulley rotating at approximately 400 R. P. M. These figures are approximate, and can be varied as desired, being mentioned solely to show the relative speeds of these particular components, designed to obtain maximum efficiency.

It is believed apparent that the invention is not necessarily confined to the specific use or uses thereof described above, since it may be utilized for any purpose to which it may be suited. Nor is the invention to be necessarily limited to the specific construction illustrated and described, said construction only being intended to be illustrative of the principles of operation and the means for carrying out said principles, it being considered that the invention comprehends any minor change in construction that may be permitted within the scope of the appended claims.

What is claimed is:

1. In apparatus for stripping leaves from stalks, a support frame; a feed table mounted thereon and formed to a width such as to permit a plurality of stalks to be supported upon and advanced along said table simultaneously; a bladed rotor journalled upon the frame forwardly of the table in the sense of the direction of movement of stalks fed along the table, said rotor including a series of flat angularly spaced blades each of which has its length parallel to the axis of rotation of the rotor, each blade in length extending the full distance across the stalk-support area of the table, each of said blades lying in a plane normal to a plane extending radially of the rotor through the blade, said blades having longitudinal cutting edges leading in the sense of the direction of rotation of the rotor, the axis of the rotor being horizontal and the plane of each blade, at the crest of the blade's travel over said axis being horizontal and slightly higher than the work table, whereby each blade will be in supporting relation to and will contact the undersides of the several side-by-side stalks advanced thereover, in a position extending perpendicularly to the lengths of the stalks, thus to cut from the stalks leaves extending downwardly therefrom while simultaneously advancing the stalks; a hood overlying the rotor and feed table and having an end opening rearwardly for passage of the stalks thereinto; a conduit having an inlet end communicating with the hood, said rotor being disposed within the inlet end of the conduit; and means for producing an air current within the hood and conduit flowing downwardly through the rotor for pulling leaves downwardly into the rotor into the spaces between the blades for cutting of the leaves by the blades.

2. In apparatus for stripping leaves from stalks, a support frame; a feed table mounted thereon and formed to a width such as to permit a plurality of stalks to be supported upon and advanced along said table simultaneously; a bladed rotor journalled upon the frame forwardly of the table in the sense of the direction of movement of stalks fed along the table, said rotor including a series of flat angularly spaced blades each of which has its length parallel to the axis of rotation of the rotor, each blade in length extending the full distance across the stalk-support area of the table, each of said blades lying in a plane normal to a plane extending radially of the rotor through the blade, said blades having longitudinal cutting edges leading in the sense of the direction of rotation of the rotor, the axis of the rotor being horizontal and the plane of each blade, at the crest of the blade's travel over said axis, being horizontal and slightly higher than the work table, whereby each blade will be in supporting relation to and will contact the undersides of the several side-by-side stalks advanced thereover, in a position extending perpendicularly to the lengths of the stalks, thus to cut from the stalks leaves extending downwardly therefrom while simultaneously advancing the stalks; a hood overlying the rotor and feed table and having an end opening rearwardly for passage of the stalks thereinto; a conduit having an inlet end communicating with the hood, said rotor being disposed within the inlet end of the conduit; means for producing an air current within the hood and conduit flowing downwardly through the rotor for pulling leaves downwardly into the rotor into the spaces between the blades for cutting of the leaves by the blades, the hood having an open forward end disposed for movement of the stalks therethrough following advancement and stripping of the stalks by the rotor; and a pan disposed between the rotor and said forward end of the hood, said pan inclining in a direction forwardly upwardly from the rotor.

References Cited in the file of this patent

UNITED STATES PATENTS

| 11,667 | Gale | Sept. 12, 1854 |
| 53,696 | Spencer | Apr. 3, 1866 |
| 216,486 | Murray et al. | June 10, 1879 |
| 287,240 | Coburn et al. | Oct. 23, 1883 |
| 1,139,756 | Doze | May 18, 1915 |
| 1,424,989 | Covey | Aug. 8, 1922 |
| 2,235,546 | Ahrndt | Mar. 18, 1941 |
| 2,611,215 | Johnson | Sept. 23, 1952 |
| 2,699,806 | Gardner | Jan. 18, 1955 |